(12) United States Patent
Walley et al.

(10) Patent No.: US 9,601,930 B2
(45) Date of Patent: Mar. 21, 2017

(54) POWER TRANSMITTING DEVICE HAVING DEVICE DISCOVERY AND POWER TRANSFER CAPABILITIES

(71) Applicant: Broadcom Corporation, Irvine, CA (US)

(72) Inventors: John Walley, Ladera Ranch, CA (US); Reinier Van Der Lee, Lake Forest, CA (US); Yasantha Rajakarunanayake, San Ramon, CA (US); Vadim Bishtein, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 108 days.

(21) Appl. No.: 13/631,185

(22) Filed: Sep. 28, 2012

(65) Prior Publication Data

US 2014/0094116 A1   Apr. 3, 2014

(51) Int. Cl.
    *H02J 7/00*     (2006.01)
    *H02J 7/02*     (2016.01)
(52) U.S. Cl.
    CPC ............ *H02J 7/0004* (2013.01); *H02J 7/025* (2013.01)
(58) Field of Classification Search
    None
    See application file for complete search history.

(56) References Cited

U.S. PATENT DOCUMENTS

| 8,159,183 | B2 | 4/2012 | Choi et al. |
| 8,169,185 | B2 | 5/2012 | Partovi et al. |
| 8,390,249 | B2 | 3/2013 | Walley et al. |
| 8,868,372 | B2 | 10/2014 | Iida et al. |
| 8,884,468 | B2 | 11/2014 | Lemmens et al. |
| 2009/0286475 | A1* | 11/2009 | Toncich et al. ............. 455/41.1 |

(Continued)

FOREIGN PATENT DOCUMENTS

| CN | 101529688 A | 9/2009 |
| CN | 101971453 A | 2/2011 |

(Continued)

OTHER PUBLICATIONS

Office action directed to related Taiwanese Patent Application No. 102133485, mailed Jan. 12, 2015; 6 pages.

(Continued)

*Primary Examiner* — Ping Hsieh
*Assistant Examiner* — James Yang
(74) *Attorney, Agent, or Firm* — Sterne, Kessler, Goldstein & Fox PLLC

(57) ABSTRACT

A wireless power transfer system is described that includes a power station and a chargeable device. The power station transmits discovery beacons in order to detect a chargeable device within its vicinity using any available communication protocols and/or standards. Once a device is discovered, the power station can perform coil selection with the device in order to select preferred coils for power transfer. In addition, the chargeable device is capable of detecting the beacon signal and providing a response to notify the power station of its presence. The chargeable device is capable of performing its own coil selection for further optimization and includes various assistance functionality to aid a user in optimizing a connection with the power station.

15 Claims, 12 Drawing Sheets

(56) References Cited

U.S. PATENT DOCUMENTS

| | | | |
|---|---|---|---|
| 2010/0093278 A1* | 4/2010 | Abel et al. | 455/41.1 |
| 2010/0201202 A1* | 8/2010 | Kirby et al. | 307/104 |
| 2010/0289341 A1 | 11/2010 | Ozaki et al. | |
| 2010/0314946 A1 | 12/2010 | Budde et al. | |
| 2010/0315038 A1 | 12/2010 | Terao et al. | |
| 2011/0248673 A1* | 10/2011 | Aerts et al. | 320/108 |
| 2012/0071089 A1* | 3/2012 | Charrat et al. | 455/41.1 |
| 2012/0313577 A1* | 12/2012 | Moes et al. | 320/108 |
| 2013/0024059 A1* | 1/2013 | Miller et al. | 701/22 |

FOREIGN PATENT DOCUMENTS

| | | | |
|---|---|---|---|
| CN | 101978571 A | 2/2011 | |
| CN | 102027688 A | 4/2011 | |
| CN | 102082449 A | 6/2011 | |
| CN | 101375483 B | 8/2011 | |
| CN | 102318212 A | 1/2012 | |
| CN | 102421349 A | 4/2012 | |
| CN | 101351143 B | 7/2012 | |
| EP | 1972253 A1 | 9/2008 | |
| WO | WO 2010/047850 A1 | 4/2011 | |

OTHER PUBLICATIONS

Office action directed to related Chinese Patent Application No. 201310456263.9, dated Apr. 15, 2015; 8 pages.

\* cited by examiner

POWER TRANSMITTING DEVICE HAVING DEVICE DISCOVERY AND POWER TRANSFER CAPABILITIES

BACKGROUND

Field of Invention

The disclosure relates to a wireless charging station and wirelessly-chargeable receiver and specifically to the improved discoverability and setup capabilities of those devices.

Related Art

Wireless power transfer stations, such as power pads, have recently become known. However, their current crude designs and low efficiency make them relatively undesired by a large amount of the population. As a result, such power transfer stations have not gained the popularity that was originally expected.

Current wireless power transfer stations lack the means to quickly and efficiently connect with a nearby device. Instead, the connection setup is conventionally performed using wireless power transfer (WPT) communication protocols, which are slow and inaccurate. Therefore, charging devices on a conventional wireless power transfer station may take several seconds to initialize. In addition, without having the ability to communicate between the station and the charging device in a more robust way, the power transfer cannot be easily optimized.

Additional problems will arise when future WPT standards come into use. Conventional power transfer stations lack the ability to operate within alternative standards, nor the ability to even detect such additional standards. As such, new functionality is needed to enhance the usefulness of wireless power transfer stations.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Figure 1:
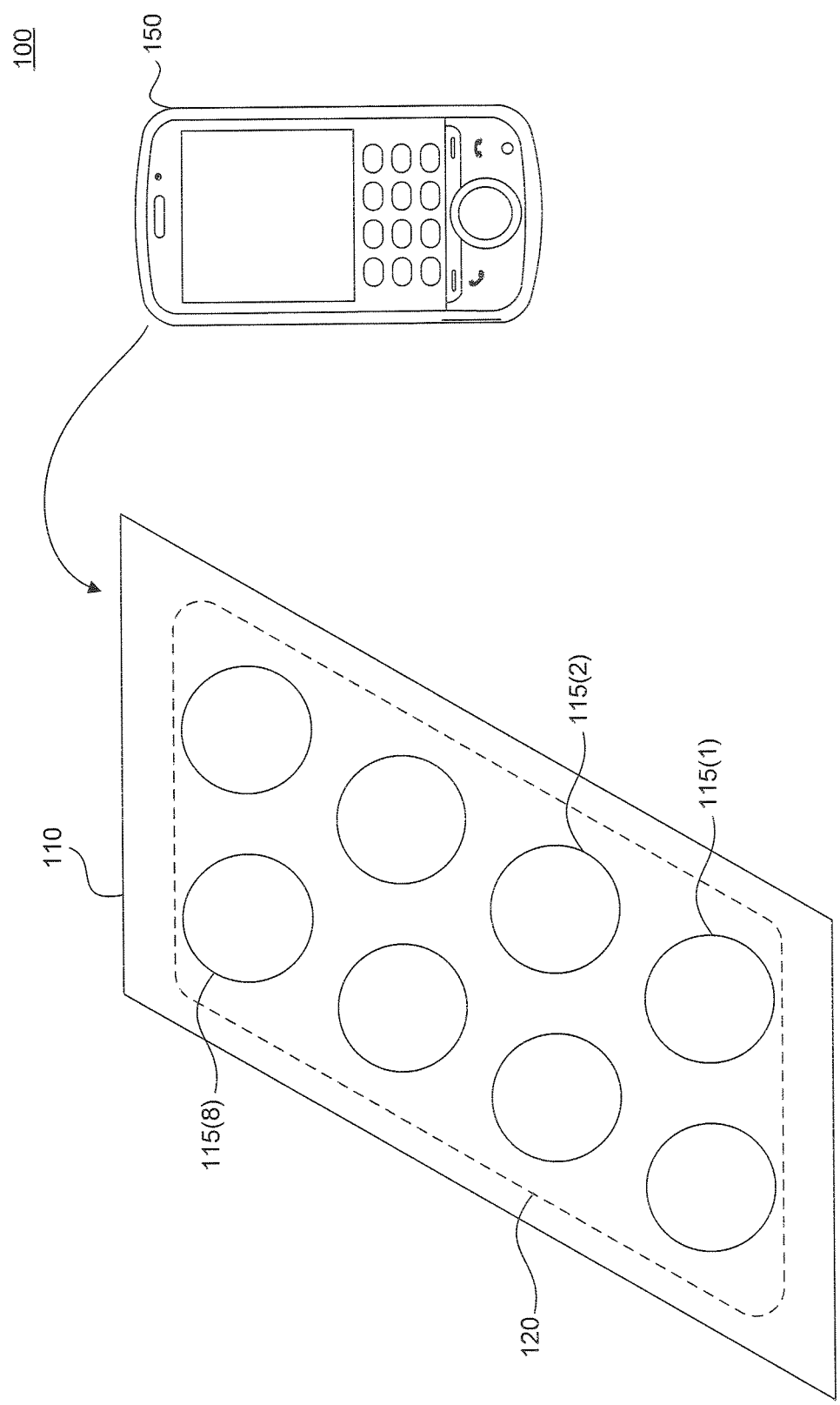
FIG. 1 illustrates an exemplary wireless power transfer environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many various charging and/or communication methods without departing from the spirit and scope of the present disclosure.

An Exemplary Wireless Power Transfer Environment

FIG. 1 illustrates an exemplary wireless power transfer environment 100. The environment 100 includes a wireless power transfer station (hereinafter "power station") 110. The power station 110 includes at least one coil 115 (115(1)-115(8) in the example of FIG. 1) arranged in a grid or matrix pattern. The coils send and receive signals between a wirelessly-chargeable device 150. The exchanged signals can include data, commands and/or other communications, and can be used to transfer power from the power station 110 to the device 150. In an embodiment, the power station 110 may also include an outer coil 120, discussed in detail below.

When a user of the device 150 seeks to wirelessly charge a battery or other power storage device within the device 150, the user moves the device 150 to be within a proximity of the power station 110. After an initialization and setup period, the power station 110 loads power transfer signals onto one or more of its coils 115 and transmits those signals to the device 150. The device receives the signals from the coils 115 of the power station 110 and extracts power therefrom. In this manner, the power station 110 functions as a power transmitter and the device 150 functions as a power receiver. In embodiments, the wireless power transfer is implemented as a magnetic coil-to-coil power transfer using a transmit coil and a receive coil. The transmit coil is excited with an AC current to produce an alternating magnetic field, that induces a secondary AC current in the receive coil. The secondary current can then be rectified using a diode bridge so as to produce a DC voltage that can be stored in a battery or used to power receiver circuits.

Exemplary Wireless Power Transfer Device and Functionality

Figure 2:
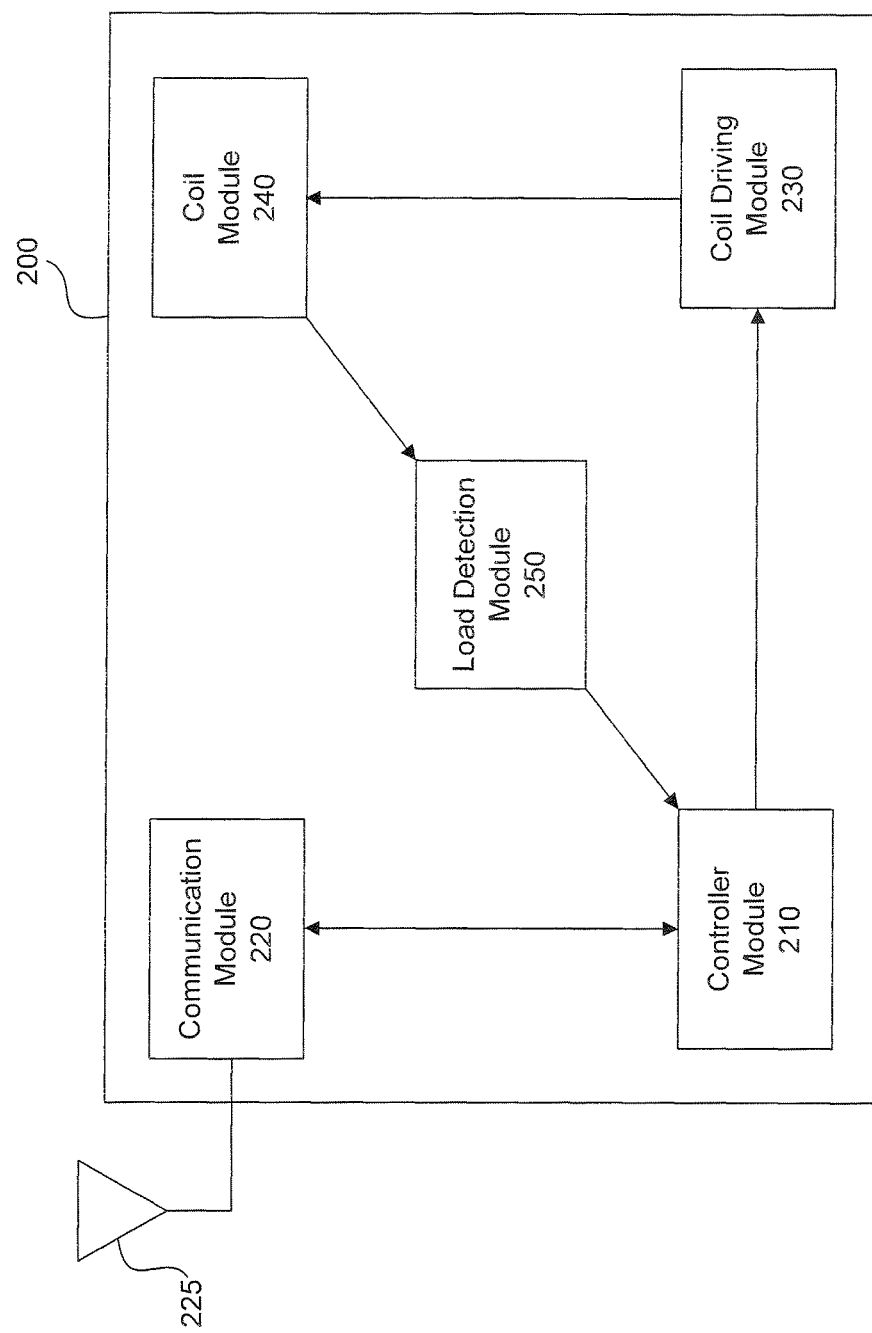
FIG. 2 illustrates a block diagram of an exemplary wireless power transfer station.

FIG. 2 illustrates a block diagram of an exemplary wireless power transfer station 200. The power station 200 includes a communication module 220 and a coil driving module 230, and may represent an exemplary embodiment of the power station 110.

The power station 200 includes a controller module 210 that controls the general operation of the power station 200, including communicating with an external device, receiving signals from the coils of the power station 200 and causing signals to be loaded onto the coils.

The communication module 220 connected to an antenna 225 and may include one or more wireless communication circuits, systems, and/or protocols for wireless communicating with other similarly-capable devices. For example, the communication module 220 may include any of Bluetooth, WiFi, WLAN, radio, infrared, optical, ultrasonic, NFC, and RFID, as well as any other wireless communication capability that is now known or later discovered, or any combination thereof (hereinafter collectively referred to as "out-of-band communication protocol").

The coil driving module 230 generates signals for transmission to the environment 100 via the coils and loads those signals onto the coils. A coil module 240 includes the one or more coils and receives the signals from the coil driving module 230. Using the coils, the power station 200 may also be capable of communicating with other devices using WPT communication standards or other coil related standard such as NFC. In order to receive communications, or to detect coil loading information, the power station 200 includes a load detection module 250 that detects electrical load variations among the coils, and is capable of determining load characteristics of those coils.

Discovery

As previously discussed, one problem with conventional wireless power stations is the delay before power transfer occurs. A substantial portion of this delay results from the initialization and setup period that may occur in conventional stations.

In order to more efficiently discover a wirelessly-chargeable device within the vicinity of the power station 110, the power station 110 may transmit a ping signal on all of its coils 115 simultaneously. Doing so increases signal strength, and becomes easier for a nearby device 150 to detect the ping signal and respond. In an embodiment, the ping signal can be transmitted over a subset of the coils 115 simultaneously. The subset of coils should include at least two coils, and all coils within the subset should be adjacent to at least one other coil within the subset. In this manner, the ping signal can be transmitted with increased signal strength, while maintain at least some of the coils 115 in a power transfer or low-power state.

In an embodiment, the power station 110 transmits different ping signals depending on whether a receiving device has been detected. For example, prior to detection of a receiving device, the power station 110 may transmit "short" pings. The short ping may be a reduced power un-modulated signal in order to enable fast multimode detection by the receiving device. The duration of the short ping can be, for example, 1 msec, although other durations could be used. Intervals between short ping transmissions should be high enough to allow for fast connection, but low enough to reduce power consumption. An interval of approximately 50 msec may be sufficient in some applications, although other durations could be used. When the short ping is detected by a receiving device, the receiving device may notify the power station 110 of its presence through load modulation.

When the power station 110 detects a change in its load due to the load modulation caused by the receiving device, the power station 110 can then switch to an "extended" ping. The extended ping should have a duration that allows for sufficient energy transfer for the receiving device to wake up and perform setup. The duration of the extended ping may be 50-100 msec, for example. By switching to the extended ping only after the receiving device has been detected, power can be conserved while still scanning the environment for devices through use of the short ping.

In an embodiment, one or more devices may be charging on the power station 110. From an earlier initiation, or based on loads detected by its load detection module 250, the power station 200 should be aware of the coils occupied in charging the one or more charging devices. Therefore, using this information, the controller module 210 instructs the coil driving module 230 to transmit the ping signal via one or more of the remaining coils within the coil module 240. For example, the controller module 210 can instruct the coil driving module 230 to transmit the ping signal on all unused coils, or a group of the unused coils, as described above.

By modulating ping signals onto the coils, each of the above scenarios employs load modulation for sending the ping. However, as an alternative, the power station may employ an independent wireless communication system for initiating communication with the charging device. For example, in an embodiment, the controller module 210 of the power station 200 may generate a ping signal, which it forwards to the communication module 220. The communication module 220 then transmits the ping signal via the antenna 225 into the environment 100 using one or more of its wireless communication protocols, such as and of the out-of-band communication protocols listed above, for example. Using an out-of-band communication protocol allows for greater range. In addition, WPT communications may be undecipherable when the receiving device 150 it out of position with respect to the coils of the power station 110. The out-of-band communication protocol can be used in addition to, or as an alternative to, pinging via the coils 115.

In an embodiment, the communication protocol used for discovery can change based on one or more parameters. For example, the power station 200 may select at least one of the communication module 220 or the coils 115 for transmitting the ping signal depending on the time, coil position of the coils 115 with respect to the receiving device 150, desired communication protocol, etc. During periods when the coils 115 are not being used to transmit the ping signals, they can be turned off unless otherwise being utilized.

To provide an example, before a device has been detected, the power station 200 may utilize the communication module 220 to transmit the ping in order to achieve increased range. The communication module 220 can determine proximity of the receiving device 150 based on one or more of several parameters, including signal strength, time of response, and triangulation. When the receiving device falls within a predetermined proximity, the power station 200 may switch to the coils 115 to combine the ping with other preliminary setup functions performed by the coils 115 (e.g., coil alignment, etc.). In this manner, the coils 115 can be kept in an idle state until the receiving device 150 is in range of receiving their communications. To provide another example, the communication module 220 could periodically be used in order to assist with device alignment. In particular, if the receiving device 150 is not properly aligned with one or more of the coils 115, it may be unable to receive WPT communications. Therefore, periodically using the communication module 220 can assist the alignment procedure.

In an embodiment, the receiving device 150 could instead transmit a notification signal to notify the power station 200 of its presence. For example, a parameter, such as a user instruction, a power level of the receiving device, etc. can cause the receiving device 150 to transmit the ping signal to the environment. When sufficiently close the power station 200, this ping signal can be received by at least one of the communication module 200 and the coils 115. The received ping signal can be forwarded to, and deciphered by, the controller module 210. Once deciphered, the controller module 210 controls at least one of the communication module 220 and the coils 115 to communicate with the receiving device 150 to perform preliminary setup, etc. For example, the controller module 210 can cause the communication module 220 to transmit its ping signal in response. In this manner, charging can be quickly initiated because it is based on a demand by the receiving device 150.

Discovery in Multi-Standard Environment

In order to be adaptable to additional standards, each of the above configurations can be slightly modified so as to allow discovery of devices that may be in a different standard. In an embodiment, the power station can perform any of the above discovery techniques for multiple standards in succession. For example, the power station 110 can transmit a first standard ping signal on all coils or a group of coils, and then subsequently transmit a second ping signal of the coils. Similarly, while some of the coils are being used for power transfer, the other unused coils can be controlled to transmit ping signals for other standards.

In order to optimize discovery, the power station can adjust the ping signals based on the popularity or expectation of the standard. For example, a first standard may be much more widely used in devices than a second standard. In this scenario, the controller module 210 can instruct the coil driving module 230 (or communication module 220) to transmit the ping signal of the first standard more often than the ping signal of the second standard. The ratio among the ping signals can be adjusted based on popularity, based on the standards of devices discovered by the power station, based on user input, or based on any other statistically relevant information.

In another embodiment, the power station 110 can transmit a universal beacon that can be detected among devices of all wireless power transfer standards. The universal beacon may include a universal data packet that has its own message. The packet could include all the necessary information necessary for nearby devices to assess their charging capabilities, such as standards supported by the power station 110. The universal beacon may be transmitted to the environment 100 by the coils 115 or the communication module 220.

The device 150 would be configured to recognize the universal beacon. Therefore, the device 150 could be configured to extract the information from the universal beacon in order to determine its power charging options. The device 150 could then emit a response signal that also has a universal format in order to apprise the charging station of its parameters before beginning power transfer. Alternatively, the device 150 could emit the response signal using one of the available standards identified in the universal beacon.

Increased Communication Distance

Conventional WPT communication standards do not allow for transmitting information over long distances, as an extremely close proximity between the communicating devices is required. Consequently, the power station and the chargeable device are unable to communicate with each other until they are nearly touching. This obviously creates a substantial delay in the initiation of the charging of the device.

In order to allow for earlier communication between the device and the power station, it is desirable to increase the communication distance of the power station. Therefore, in an embodiment, the power station 110 includes an outer coil 120. The outer coil is disposed around a perimeter of the power station 110, or alternatively around a group of coils 115. The outer coil 120 is capable of being energized with data signals that it transmits to the environment 100. The outer coil 120 can operate at different frequencies, and/or protocols and may allow for inner coils to be turned off in certain situations. Due to its size, signals energized onto the outer coil 120 can travel further in the environment 100. Consequently, a device 150 approaching the power station 110 will receive the initiation signal at an earlier time, and can begin preliminary setup with the power station 110 en route to the power station 110.

In an embodiment, the outer coil 120 can perform the pings of the environment 100 in cooperation with the coils 115. For example, the outer coil 120 can transmit a long-distance ping signal to notify devices out of range of pings transmitted by coils 115. Following the long-distance ping, the coils 115 can transmit one or more short-distance pings to establish better communication with devices within their range, and also to conserve power.

In an embodiment, the coils 115 can also be configured to transmit ping signals over long distances. For example, the coil driving module 230 can drive all of the coils to simultaneously transmit a high-powered ping signal. The constructive sum of the high-power pings sent from the coils 115 will increase the transmission distance of the ping signal. In addition, this high-power simultaneous transmission by the coils 115 can be performed with a low duty cycle to conserve power. The high-power ping transmission by the coils 115 can be performed in addition to, or instead of, the long-distance ping generated by the outer coil 120.

In addition to the high-power simultaneous ping, the coil driving module 230 can drive the coils 115 with a plurality of different power levels and/or duty cycles. For example, the coil driving module 230 can drive the coils 115 to simultaneously transmit a high-power ping signal, and then to transmit a mid-power ping signal followed by a low-power ping signal. Other power levels can be employed as well, until the coil driving module 230 drives the coils 115 to issue a high-power ping signal again. In an embodiment, the high-power ping signal has a lower duty signal than the other-power ping signals. Also, in an embodiment, the high-power ping signal is emitted with a predetermined frequency, whereas the ping signals emitted in between high-power ping signals have random power levels other than high-power.

Preliminary Setup

Once the device 150 has received the ping signal, the device 150 is aware of the power station 110. At this time, the device 150 can begin the preliminary setup with the power station 110.

In an embodiment, the preliminary setup may include exchanging device parameters, capabilities and other information between the chargeable device 150 and the power station 110. For example, once the device 150 has received the ping from the power station, the device 150 may make an internal decision regarding whether to initiate the preliminary setup. This decision may be as simple as whether the power station 110 is capable of charging the device 150 based on standards, power needs, etc. Once the device 150 has determined to continue with the preliminary setup, the device 150 responds to the power station 110 with the necessary information.

In an embodiment, the response can be sent to the power station using the same or different form of wireless communication employed by the power station. For example, if the device 150 received the ping over WPT load modulation, the device 150 can transmit the response signal using the same protocol. Alternatively, a different protocol can be used. For example, the initial ping may made using any of the out-of-band communication protocol described above. Communication between the devices can switch to WPT either for the immediate response signal, or after an initial setup has completed.

For example, in an embodiment, the power station 110 begins initial communication with the device 150 using NFC. The NFC standard includes its own field powering mechanism. Consequently, even when the device 150 has not stored charge, the power extracted from the NFC initiation signals can provide sufficient power to the device to begin the setup process. Once the necessary information has been exchanged, and the setup has completed, the power station 110 and the device 150 can switch to the WPT protocol. The signals transferred in the WPT protocol can then be used to provide power to the various components of the device 150.

In the response, the device 150 can include any information that may be relevant to the charging/connection between the device 150 and the power station 110. For example, the device can report its model number, power transfer standard preferences, power needs, etc. This information is received either at the communication module 220 or the coil module 240, depending on the transmission protocol employed by the device 150, and forwarded to the controller module 210. From this information, the controller module can tailor the charging characteristics employed by the power station 200. For example, based on the model number of the device 150, the controller module can access stored data relating to that model in order to optimize charging. This data may include thermal properties, metal layouts, shielding properties and expected interferences, among others. This data may have many additional uses, such as improving foreign object detection, for example.

Coil Selection

After performing the preliminary setup, the device 150 will be brought in close proximity with the power station 110. At this time, and particularly when the device 150 has been placed on the power station 110, coil selection should be performed to select the coils that have preferred power transfer characteristics. In other words, a device may only overlap a small number of the available coils. Therefore, the coils that are successfully and efficiently transferring power to the device should be selected in order to maintain efficiency and conserve power. Meanwhile, coils that are inefficiently transferring power, or not transferring power, to the device can be placed in a low-power or off state.

In an embodiment, the device 150 sends an "awake notification" in immediate response to the ping received from the power station 110, and the coil selection follows thereafter and may be combined with the preliminary setup (particular when the preliminary setup is performed using WPT communications). In an embodiment where another wireless communication protocol is being used to communicate between the power station 110 and the device 150, the power station 110 can determine when to initiate the coil selection based on the RSSI (Received Signal Strength Indicator) of the signals received from the device 150.

Figure 3:
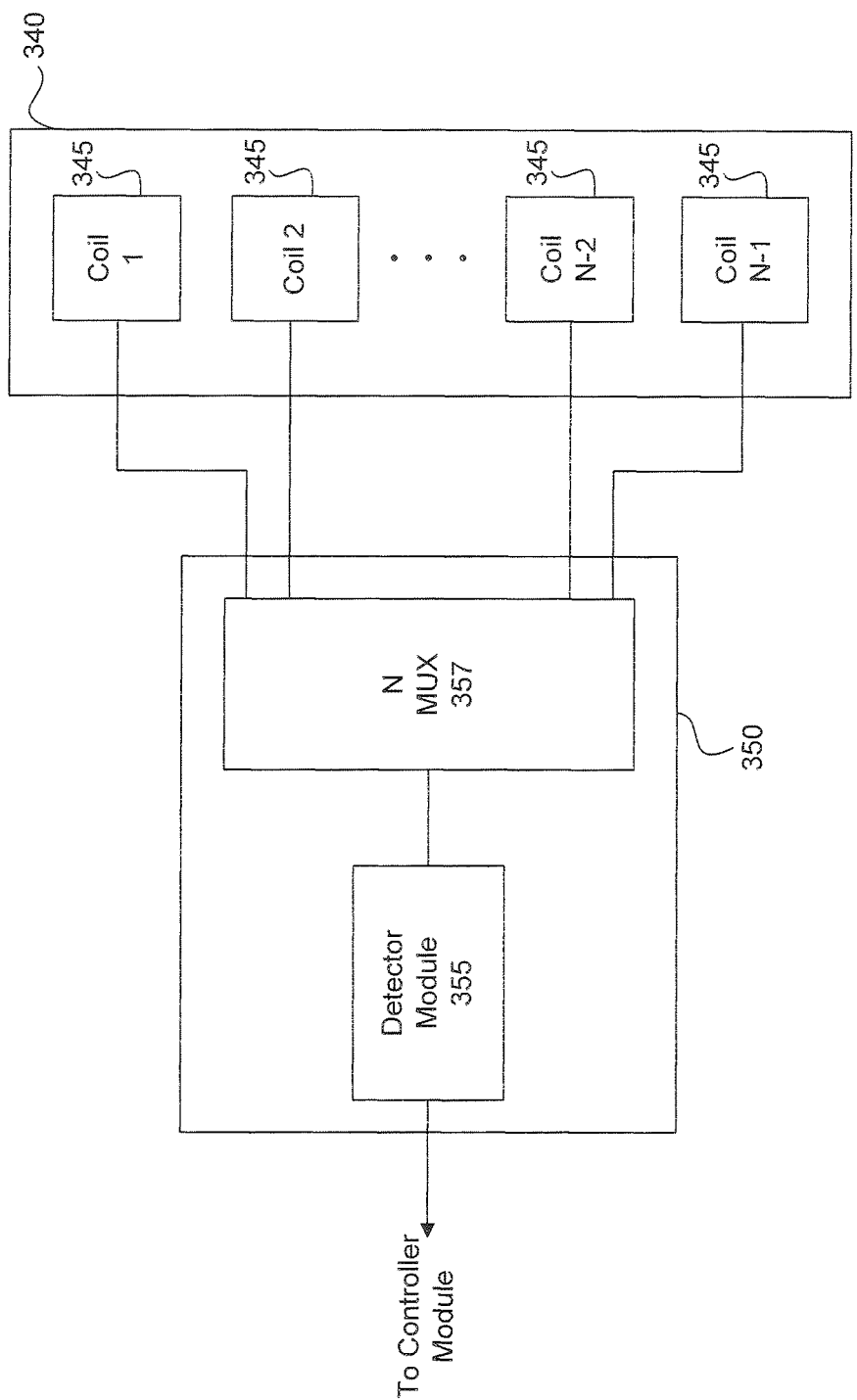
FIG. 3 illustrates a block diagram of an exemplary coil module and load detection module.

FIG. 3 illustrates a block diagram of an exemplary coil module 340 and load detection module 350. The coil module 340 includes a plurality of coils 345 and may represent an exemplary embodiment of the coil module 240, and the load detection module 340 includes a detector module 355 and a multiplexer 357, and may represent an exemplary embodiment of the load detection module 240.

In an embodiment, once the coil selection process begins, the power station 110 energizes all of its coils to listen for the response signal sent from the device 150. For example, each of the coils 345 of the coil module 340 are capable of receiving response signals from any nearby device using WPT load modulation. The device emits the response, which is detected by one or more of the coils 345. Each of the coils is connected to the detector module 355 by the multiplexer 357. The multiplexer 357 is an N multiplexer corresponding to the N coils 345. The response can be the detection of a load on one or more energized coils.

As the coils 345 are receiving the response signal from the chargeable device, the multiplexer 357 selects one of the coils 345 (e.g., coil 1). The detector module 355 receives the response signal received by the selected coil and forwards the signal to the controller module 210. The multiplexer 357 subsequently selects each of the remaining coils 345, thereby allowing the response signal received by each of the remaining coils to also be detected by the detector module and forwarded to the controller module 210.

After receiving the response signals from each of the coils 345, the controller module 210 performs signal analysis on the received signals in order to determine coupling coefficients between each of the coils 345 and the chargeable device. The signal analysis may include calculating signal strengths, signal envelope analysis, among other analysis techniques. From the analysis, the controller module 210 can determine which of the coils 345 have the preferred coupling coefficient with the chargeable device. The controller module 210 then selects one or more of the coils 345 based on the coupling coefficients and instructs the coil driving module 230 to drive the selected coils to transfer power to the chargeable device.

Figure 4B:
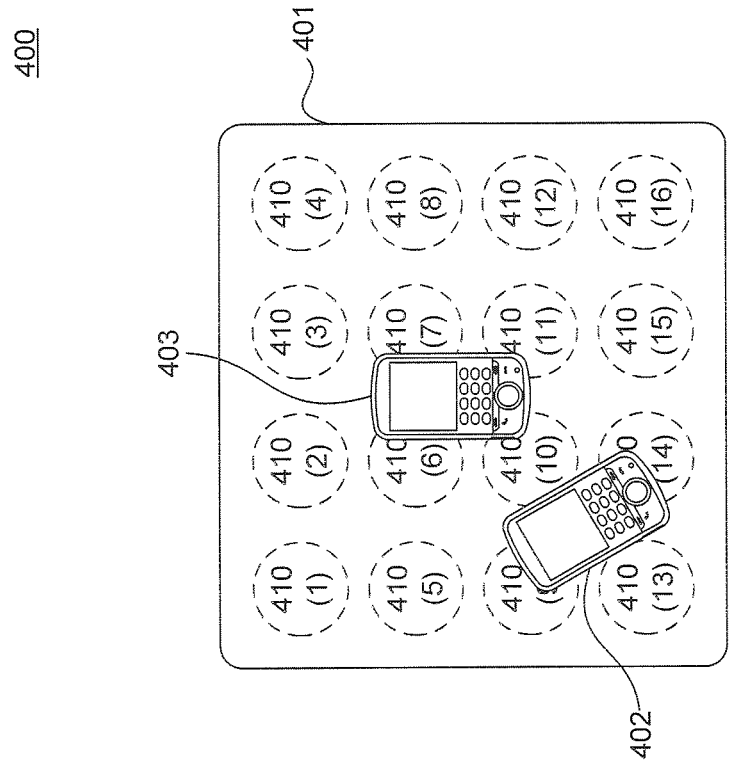
FIG. 4B illustrates a top down view of a wireless power transfer environment.
Figure 4A:
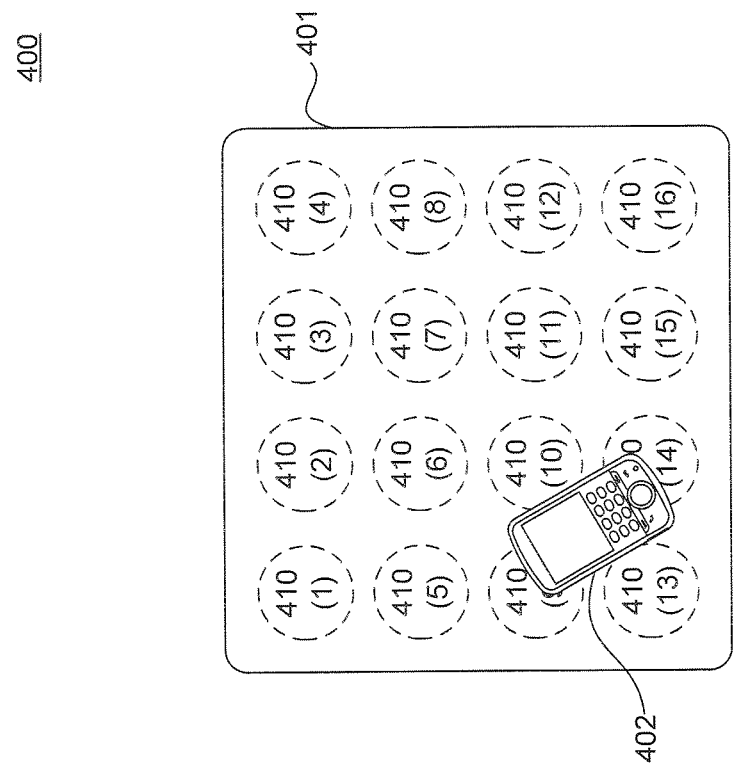
FIG. 4A illustrates a top-down view of an exemplary charging environment.

FIG. 4A illustrates a top-down view of an exemplary charging environment 400. The environment 400 includes a charging station 401 and a chargeable device 403. The charging station 401 includes a plurality of coils 410. The exemplary charging station 401 has a matrix of 16 coils 410(1)-410(16), however there may be more or fewer coils contained in the same or different arrangement as that depicted.

Based on the placement of the device 402 on the charging station 401, certain coils 410 will have better coupling coefficients with the chargeable device 402 based on their proximity to the device 402 and their orientation with respect to the device. Therefore, in the exemplary environment 400 of the FIG. 4A, the controller module 210 may determine that coil 410(14) has the best coupling coefficient, with coils 410(9), 410(10), and 410(13) have sufficient coupling coefficients to warrant driving those coils for power transfer.

In an embodiment, the receiving device (such as the chargeable device 402, for example) can perform the coil selection. In this instance, there is a need to distinguish the signals transmitted from the different coils from each other.

In an embodiment, each of the coils transmits the signals at a slightly different frequency. The receiving device will then be capable of distinguishing the different coils based on the differing frequencies of the received signals. In an embodiment, the transmitted frequencies are orthogonal to each other. The receiver device, upon receiving the transmitted signals from the coils, performs signal analysis on those signals to determine the preferred coils for power transmission. The preferred coils may be a predetermined number of coils that provide the best signal transmission, or any number of coils whose transmitted signal strengths exceed a predetermined threshold.

Once the receiving device selects the preferred frequencies, the device transmits the selection to the charging station 401 using any available communication protocol, such as WPT, or out-of-band communication protocol. Upon receipt of the selection signal from the chargeable device, the controller module 210 instructs the coil driving module 230 to drive the selected coils.

In an embodiment, rather than being transmitted on different frequencies, the coils are driven sequentially in time. With reference to FIG. 4A, the coil driving module 230 drives the coil 410(1) to transmit a signal to the environment. If the receiving device 402 is within range, it detects and performs signal analysis on the received signal. Sequential signal transmissions are then made by the other coils 410(2)-410(16). The receiving device 402 can then perform the determination of the preferred coils that has been described above with respect to the power station 401 based on the timing with which it receives the different signals. In an embodiment, the driving pattern of the coils differs depending on the proximity of the receiving device 150.

The receiving device can then transmit an identification of the selected coils, based on the timing of the received signal, for example, back to the power station 401 for selection.

In an embodiment, the receiving device 402 may not perform the actual coil selection, but still assists in the selection process. For example, the receiving device 402 can perform signal analysis based on the signals received from the power station 401 and transmit the analysis information back to the power station 401. Once the analysis information has been received, the power station 401 can utilize the analysis information to determine which of the coils have preferred coupling coefficients with the receiving device 402. From the coupling coefficients, the power station 401 can determine the preferred coils for transmitting power to the receiving device 402 based on, for example, frequency or timing.

Receiving Device with Multiple Coils

In an embodiment, in addition to the power station 401 having a plurality of coils 410, the receiving device 402 can also have a plurality of coils. In this instance, in addition to performing coil selection among the coils of the power station 401, similar coil selection is also performed for the plurality of coils of the receiving device.

For example, when selection is performed by the power station 401, each of the coils will receive signals transmitted from each of the receiving device coils. This can be performed in a sequential or simultaneous manner in accordance with the above descriptions. The power station 401 can then analyze the signals received from the chargeable device 402 in order to select the coils of the power station 401 that are used for WPT transmission. In addition, the power station 401 can select coils of the receiving device 402. Alternatively, once the power station selects its own preferred coils, it can transmit signals to the receiving device 402 for the receiving device to select its preferred coils.

Coil Selection with Multiple Devices

FIG. 4B illustrates a top down view of a wireless power transfer environment 400. The environment 400 includes the power station 401, first device 402, and second device 403.

In an embodiment, the first device 402 is in communication with the power station 401 at the time the second device 403 is brought into proximity with the power station 401. In this instance, the power station 401 transmits a communication to the first device 401 (either using WPT or other communication protocol) informing the first device that coil selection will again occur.

After the power station 401 has informed the first device 402 of the impending coil selection, the power station 401 coordinates with both of the first device 402 and second device 403 the coil selection process. As discussed above, coil selection can occur in the power station 401 based on signals received from the first device 402 and second device 403, or can occur in the first device 402 and second device 403 based on signals received from the power station 401.

Because of the coordination required when multiple devices are present on the power station 401, coil selection cannot solely take place within the individual devices. For example, if the first device 402 and the second device 403 select coils that are the same, coordination may be needed to dictate whether the selected coil will communicate with the first device 402 or the second device 403.

In this circumstance, once the devices have selected their respective preferred coils, they can communicate with each other using any available communication protocol in order to coordinate coil usage. The devices can be apprised of the communication abilities of the other device based on information received from the power station, or based on scans performed of the surrounding environment.

In an embodiment, once the devices select their preferred coils, they can forward the results to the power station 401 to make a final determination. Once determined, the power station transmits the designations of the coils back to the devices.

The power station 401 can be configured to perform coil reselections after any change to the environment, including the addition or removal of a device, the presence of foreign material, among others.

Connection Termination

As discussed above, many various communication devices and protocols may be available to establish a connection between the power station 110 and a chargeable device 150. Similarly, these various communication devices and protocols may be used to temporarily or permanently terminate a connection with the device.

During communication, there may be several different reasons to suspend or terminate a connection between the power station 110 and the device 150, such as for example the addition or removal of another chargeable device, overheating of either the device 150 or the charging pad 110, proximity of a foreign object, among others.

When one of either the power station 110 or the device 150 determines that communication should be severed, it communicates to the other of such using any of the available communication protocols. In addition to defining the termination, the power station 110 and the device 150 can also define a resumption of communication, if desired. In this manner, the power station 110 and the device 150 can effectively and efficiently handle necessary communication breaks.

Communication Diversification

During WPT communication, the device 150 may exchange communications with the power station 110 and/or other nearby devices. These communications may be designated for any available out-of-band communication protocol. However, operating these multiple systems consumes significant power. Because the device 150 is already in communication with the power station 110 through WPT, these communications can be routed through the WPT protocol in order to conserve power and simplify communication.

For example, direct communications that are designated for receipt by the power station 110 from the device 150 over a non-WPT standard can simply be forwarded through the WPT communication protocol. This reroute can be configured using the non-WPT communication protocol prior to implementation. Similarly, if the device 150 seeks to communicate with another device on or near the charging station 110 via non-WPT protocols, the device 150 can instead send these transmissions via WPT communication to the power station 110. The power station 110 can then reroute these transmissions to their designated destinations.

Exemplary Wireless Power Receiving Device and Functionality

In addition to power station, the chargeable device can also include hardware and functionality to allow for more efficient and effective power transfer within the power transfer environment.

Display Assistance

As discussed above, the position of the receiving device with respect to the coils of the power station can affect the power transfer efficiency between them. Unfortunately, conventional chargeable devices and power stations do not provide any means for a user to determine where to optimally position a chargeable device.

Figure 5:
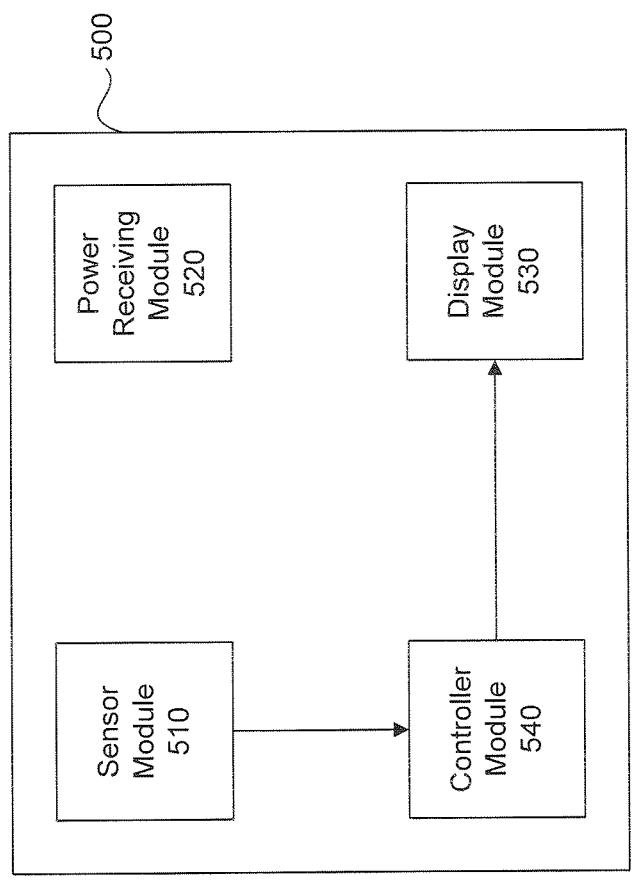
FIG. 5 illustrates a block diagram of a display assistance subsystem that may be included within a chargeable device.

FIG. 5 illustrates a block diagram of a display assistance subsystem 500 that may be included within a chargeable device. The display assistance subsystem includes a sensor module 510, a power receiving module 520, a display module 530, and a controller module 540.

The sensor module 510 includes one or more sensors to detect a spatial relationship of the device 500 to one or more coils of the charging station. In other words, the sensor module 510 detects whether the device 500 is in a strong charging position on the charging station. This can be measured based on signal strength, signal clarity, etc.

The sensor module 510 forwards the detected information to the controller module 540. The controller module 540 analyzes the detected information and determines a vector between a current position of the device 500 and a preferred location. The preferred location may be a location at which the power transfer efficiency is expected to be at a maximum.

Once the vector has been determined, the controller module 540 controls the display module 530 to display the vector to a user. Based on the displayed information, the user can know how far, and in what direction, to move the device 500.

Figure 6B:
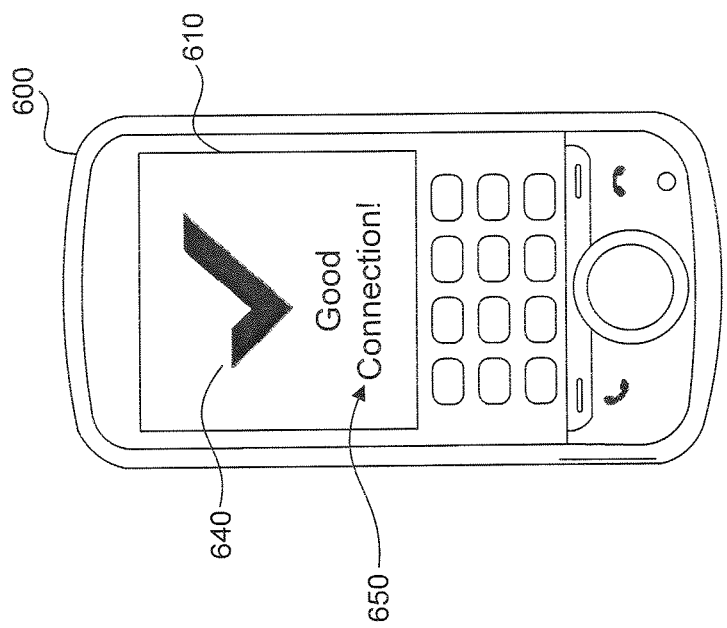
FIGS. 6A and 6B illustrate plan views of an exemplary chargeable device.
Figure 6A:
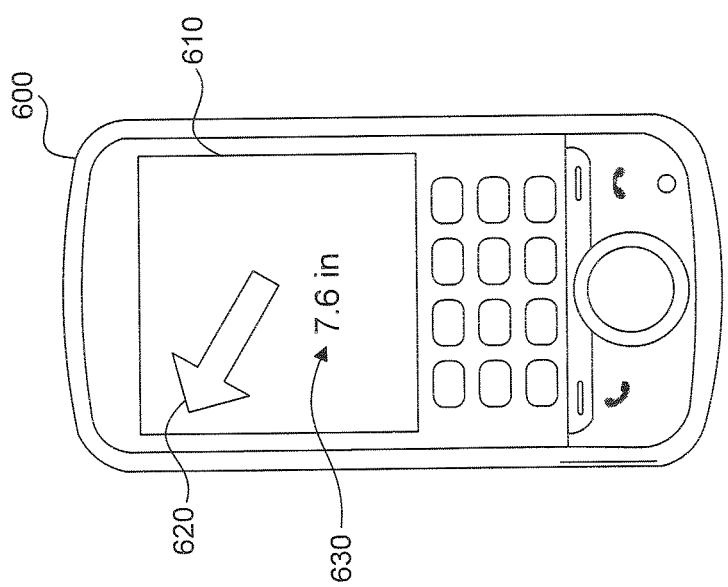

FIGS. 6A and 6B illustrate plan views of an exemplary chargeable device 600. The vector generated by the controller module 540 includes a direction and a distance value. Therefore, the display module 530 causes a display 610 on the device 600 to display the direction 620 and distance 630 so as to provide the user with an approximation of where to move the device 600.

As the user moves the device, one or more sensors within the sensor module 510 detects the movement. These sensors can include, for example, a MEMS sensor. As the device moves, the sensor module detects and forwards updated position information to the controller module 540. The controller module 540 updates the vector as the device 600 moves, and causes the display module 530 to display the updated vector to the user.

As the device 600 moves closer to its intended destination, the magnitude of the vector will continue to shrink. Once the magnitude falls below a predetermined threshold, the controller module 540 causes the display module 530 to display a success notification. For example, FIG. 6B illustrates the device 600 with a success notification being displayed on its display 610. In an embodiment, the success notification may include an illustrative indicator 640 and written indicator 650. In an embodiment, the notifications to the user, including the vector and success notifications can be made using one or more indicator lights, such as an LED.

The on/off frequency of the LED can be adjusted based on the relative location of the charging device. To the preferred location.

Throughout the process of locating the device on the power station, the various components can be powered by the receiving module 520. Specifically, the power receiving module 520 can receive power from the power station using load modulation, and provide the received power to the various components. Consequently, even when the battery of the device is empty of charge, the device 500 can provide the visual assistance to the user.

Receiver Design

As discussed above, the power station may be configured to transmit beacon signals at varying frequencies in order to increase device discovery. Therefore, it may be beneficial for a receiver within the receiving device to be capable of receiving signals within the multiple frequencies that may be transmitted by the power station.

Therefore, in an embodiment, the receiver includes one receiver coil for each frequency on which the power station may transmit signals. One receiver coil is tuned to each of the expected frequencies in order to receive all signals transmitted from the power station.

In another embodiment, the receiving device includes a single receiver coil. The receiver coil is initially tuned for broadband discovery, and is capable of being retuned to a particular frequency once a communication frequency has been established.

Figure 7:
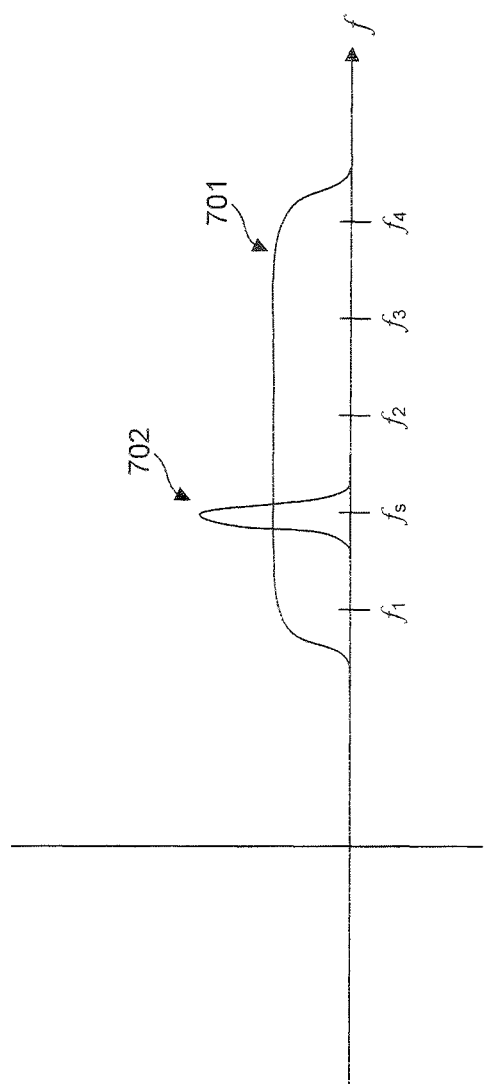
FIG. 7 illustrates a graphical representation of an exemplary frequency response of a receiver coil.

For example, FIG. 7 illustrates a graphical representation of an exemplary frequency response of the receiver coil. During preliminary discovery and communication establishment, the receiver coil can be tuned to a broadband reception state. The broadband frequency response 701 of the coil should be such that the coil is capable of detecting at least most of the frequencies on which the power station may transmit the beacon signal (e.g., frequencies $f_1$, $f_2$, $f_3$, $f_4$, and $f_5$).

Although the broadband configuration allows the receiver to receive multiple different frequencies of signals, the magnitude response of the coil in this configuration may provide less than optimal signal strengths. Therefore, once the initial communication has been established, the receiver coil can be retuned to a selected frequency $f_s$. The narrowband frequency response 702 will provide greater signal strength of received signals, as well as filter signals and noise outside of the selected narrow frequency band.

Determining Frequency

As discussed above, the receiver coil can be tuned to a broadband state in order to receive signals from multiple possible transmission carrier frequencies. However, because the broadband configuration is intended to cover multiple carrier frequencies, the receiver can include hardware and functionality that is capable of detecting the carrier frequency actually employed by the power station.

Figure 8A:
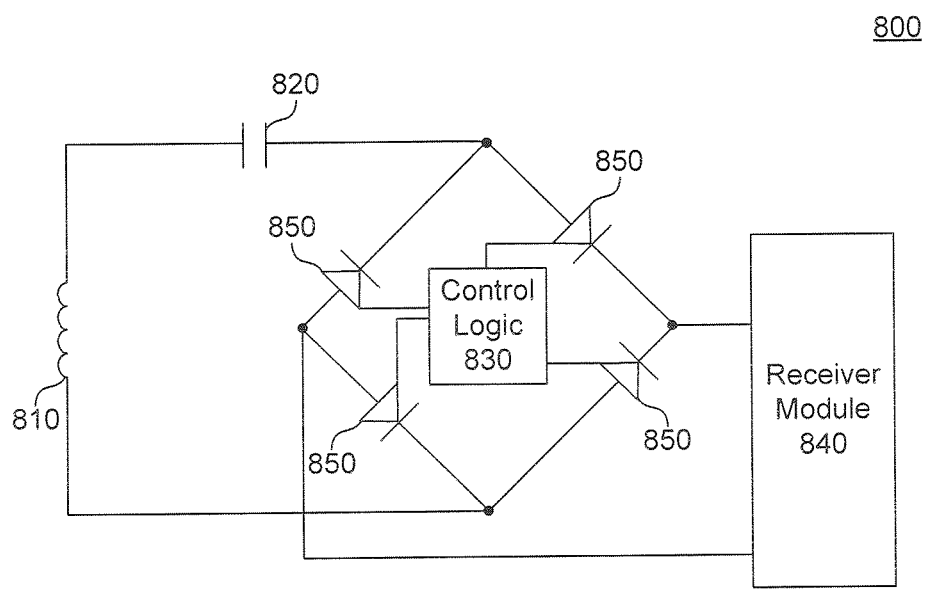
FIG. 8A illustrates a circuit diagram of an exemplary receiver that may be included within a chargeable device.

FIG. 8A illustrates a circuit diagram of an exemplary receiver 800 that may be included within the chargeable device. The receiver 800 includes a receiver coil 810, a capacitor 820, control logic 830 connected to a plurality of current control devices 850, and a receiver module 840.

In an embodiment, the receiver 800 determines the carrier frequency of the received signal based on an output of a diode bridge, or equivalent thereof. Specifically, the receiver coil 810 is loaded with a signal from the environment that includes the carrier frequency, which is filtered by the capacitor 820. The plurality of current control devices 850 are arranged in a diode bridge configuration, and can each be controlled by control logic 830. The current control devices 850 may include diodes, FETs, or other such similar devices.

Figure 8B:
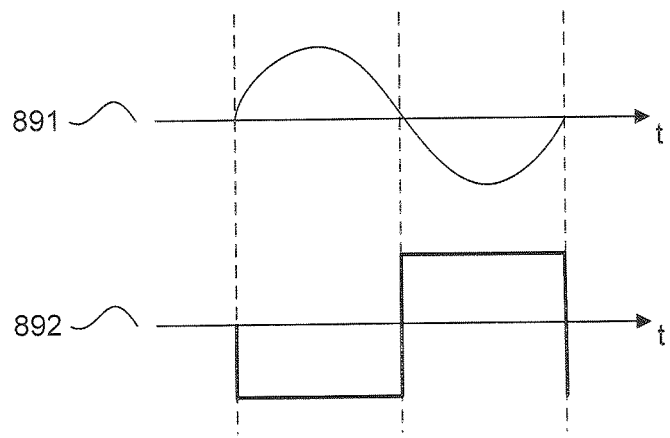
FIG. 8B illustrates graphical representations of an input signal to the receiver and an output digitized carrier frequency.

The diode bridge receives the input signal, and extracts therefrom a digital representation of the carrier frequency signal. FIG. 8B illustrates graphical representations of the input signal 891 and the output digitized carrier frequency 892. This information is sent to the receiver module 840, which can determine from the digitized carrier frequency 892 the carrier frequency of the transmission sent by the power station. Once determined, the device can retune its receiver coil to have a narrowband configuration centered at the detected carrier frequency. The coil can be tuned by having an adjustable tap for the coil 810, or a variable capacitor for capacitor 820 to affect the resonance of coil 810.

In an embodiment, the carrier frequency of the beacon signal transmitted by the power station can be detected based on pulse width and frequency of the beacon signal.

Power Distribution

The exemplary chargeable device may include several power sources and in addition to the WPT subsystem, as well as several power sinks in addition to its charging battery. Therefore, the device may be configured to allow for intelligent power distribution between the sources and sinks in order to add robustness to the device.

Figure 9A:
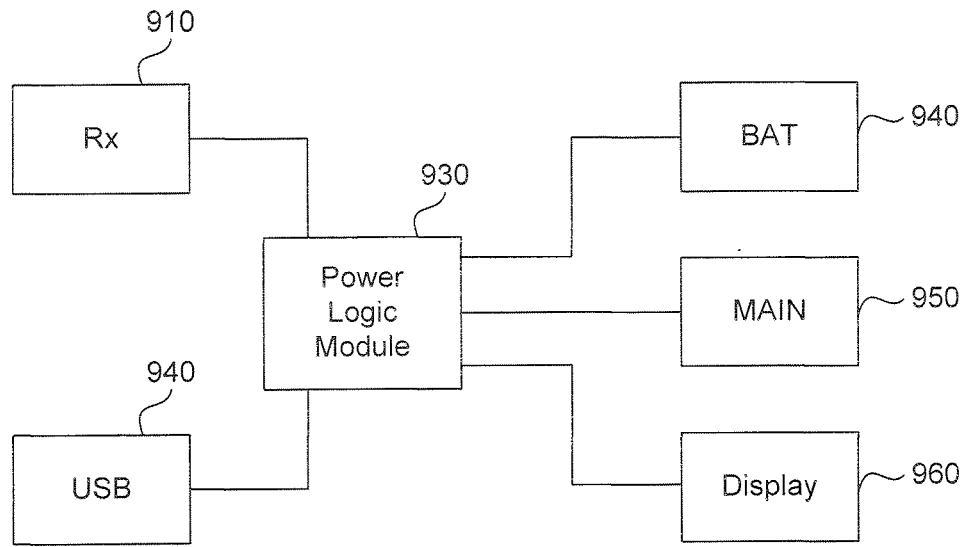
FIG. 9A illustrates a block diagram of an exemplary chargeable device.

FIG. 9A illustrates a block diagram of an exemplary chargeable device 900. The chargeable device includes a receiver module 910 (e.g., when receiving power signals), a USB module 920, and a battery, all of which may act as power sources. The device also includes a main subsystem module 950 and a display module 960 that, in addition to the battery 940 and receiver module 910 (e.g., when transmitting power signals), may act as power sinks, as described below. The device 900 also includes a power logic module 930 to control power distribution between the various components. Those skilled in the relevant art(s) will recognize that more or fewer power sinks and sources may be included within the device 900 within the spirit and scope of the present disclosure.

The receiver module 910 may be capable of extracting power from received signals, such as through WPT or NFC communications. The USB module 920 may receive operating power from its USB connection to another device and the battery module 940 may provide stored power to the various components of the device 900. Therefore, the receiver module 910, the USB module 920, and the battery module 940 can each act as a power source. Meanwhile, the battery module 940, the main subsystem module 950, the display module 960, and the receiver module 910 are all capable of consuming power based on their operating states, and therefore can all be classified as power sinks.

Figure 9B:
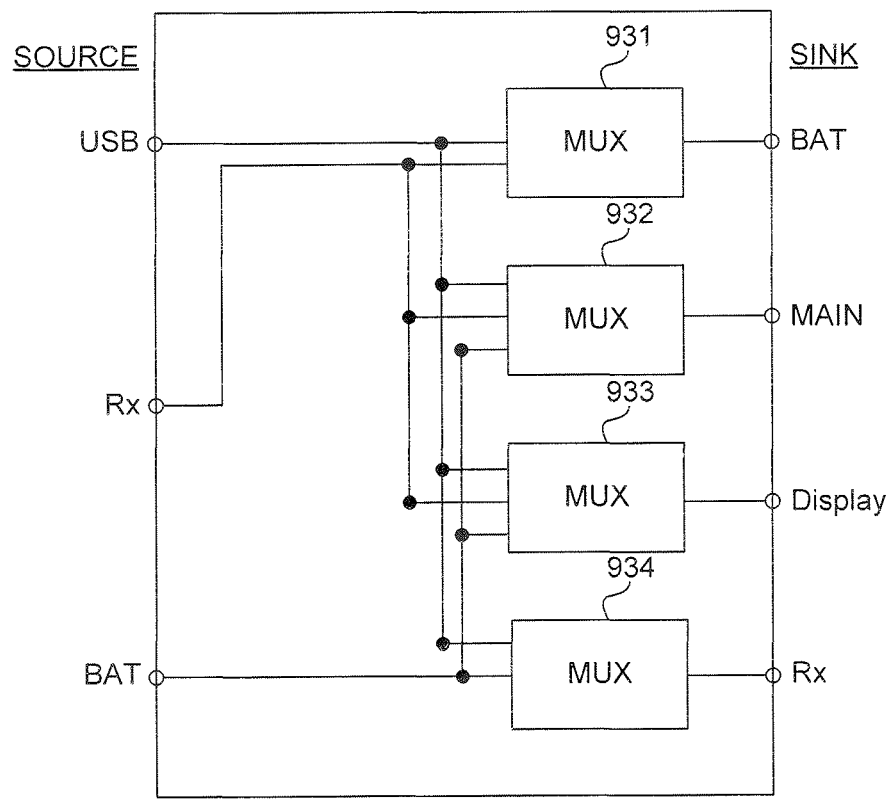
FIG. 9B illustrates a high-level circuit diagram of the power logic module.

FIG. 9B illustrates a high-level circuit diagram of the power logic module 930. The power logic module includes multiplexers 931-934 corresponding to each of the power sinks. Each multiplexer has inputs of each available power source. Because a power source is incapable of providing power to itself, it is considered unavailable for purposes of its multiplexer's inputs.

Therefore, multiplexer 931 corresponding to the battery module 940 has as its inputs the receiver module 910 and the USB module. The power logic module 930 is capable of detecting power sources that are currently providing power, and routes the received power to the power sinks that require the power. This can be done in a hierarchical manner based on current devices operational needs.

For example, during display assistance when charging on a power station (discussed above), the power logic module 930 receives power from the receiver module and controls multiplexer 933 to select the receiver module input to provide power to the display module 960. Once the display assistance has completed, the power logic module 930 deselects the receiver module as the input to the multiplexer 933 and selects the receiver module input to the multiplexer 931 in order to provide charging power to the battery module 940. Through monitoring and configuration updating, the power logic module 930 can route received power to needed components within the device 900.

Cloud Based Charging Assistance

In any given environment, there may be several power stations available for use by a chargeable device. However, with the introduction of new and additional power transfer standards, some of these stations may be ineffective for charging the device. In addition, some may require payment (discussed below), whereas others may be free. Many other properties, such as power station availability, may aid a user in selecting and locating a nearby power station for charging the user's device.

In order to gain access to this information, a cloud-based system can be utilized. In the cloud-based system, devices and device users gather information of the various power stations as they use or pass by those power stations. The devices upload the gathered information to the cloud (e.g., a server), which is then accessible by other devices. Therefore, a device seeking to use a power station for charging can access the cloud and download data relating to the environment. From the downloaded information, the device can select a nearby available power station that supports a power transfer standard supported by the device. The device can then navigate its user to the selected power station using GPS or other mapping techniques.

Billing

As power stations are integrated into public settings, it may become important for power suppliers to bill individuals for the use and power consumption of their power stations. Consequently, in an embodiment, the device can include payment functionality to pay for power received from the power station.

In an embodiment, the device acts as a prepaid card, and can be "loaded" with an amount of money defined by its user after payment has been made to a third-party company. In an embodiment, payment can be rendered after charging has taken place. For example, the device can upload its credit card and authorization information to the power station prior to charging. The power station can then charge for the power transferred to the device after charging completes. In another embodiment, payment can be rendered in advance and the power station will transfer an amount of power equivalent in value to the advance payment.

Payment information, such as account and authorization information can be transferred using any available communication standard, including WPT, out-of-band communication protocol, etc.

Billing for transferred power allows for many additional configurations. For example, the power station can offer premium power (e.g., fast transferring, prioritized over other devices, etc.) at a premium cost rate. In addition, wireless service providers can bundle wireless power transfer charges into their service fees. Alternatively, the power station itself can provide a bundled charge to receive both power and wireless network access. In these manners, charging stations can generate revenue for power and other services transferred to devices that utilize their services.

Exemplary Method for Wirelessly Transmitting Power

Figure 10:
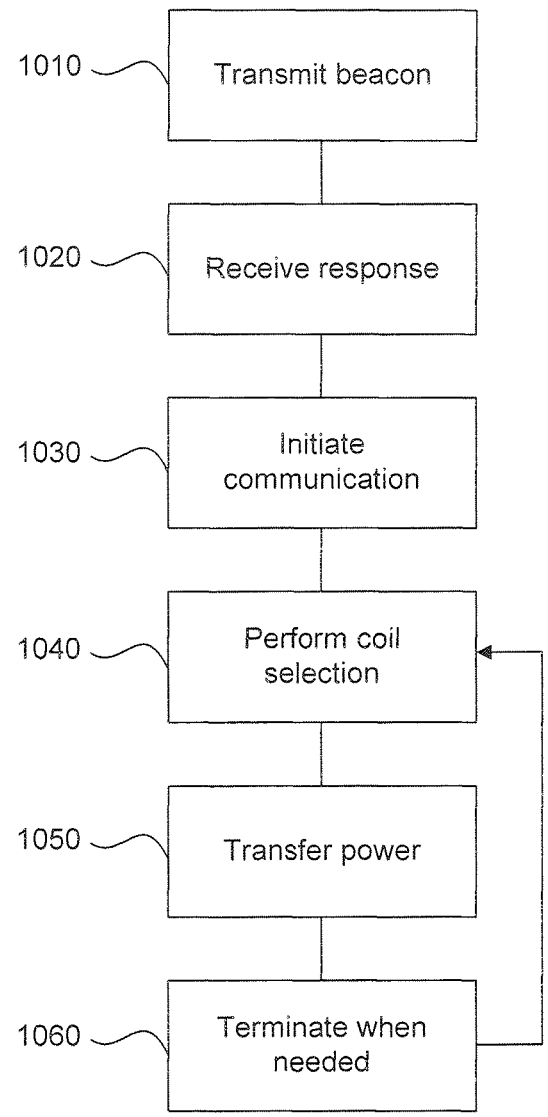
FIG. 10 illustrates a block diagram of an exemplary method for transferring power from a power station to a chargeable device.

FIG. 10 illustrates a block diagram of an exemplary method for transferring power from a power station to a chargeable device.

The power station begins by transmitting a beacon signal to a surrounding environment (1010). The beacon can be transmitted at different frequencies, with different duty cycles, and/or using different standards. Upon receipt of a response signal from a nearby device (1020), the power station initiates communication with the device (1030). The communication may include preliminary setup and can be performed on any mutually available wireless communication protocol.

Once the preliminary setup has been performed and needed device characteristics have been obtained and accounted for, the power station begins a coil selection process (1040). The coil selection process includes determining a power coupling between each coil of the power station and each coil of the chargeable device based on signals transmitted by the power station and/or the chargeable device.

After coil selection has concluded, the power station drives selected coils (determined during the coil selection process) to transmit power transfer signals to the chargeable device (1050). In certain circumstance, the power station may terminate power transfer (1060) to the chargeable device. If the chargeable device remains at or near the power station, power transfer can resume at a later time, likely after repeating the coil selection process (1040). Alternatively, the method ends.

Those skilled in the relevant art(s) will recognize that the above method can additionally or alternatively include any of the functionality of the power station 110 discussed above, as well as any of its modifications. Further, the above description of the exemplary method should neither be construed to limit the method nor the description of the mobile device power station 110.

Exemplary Method for Wirelessly Receiving Power

Figure 11:
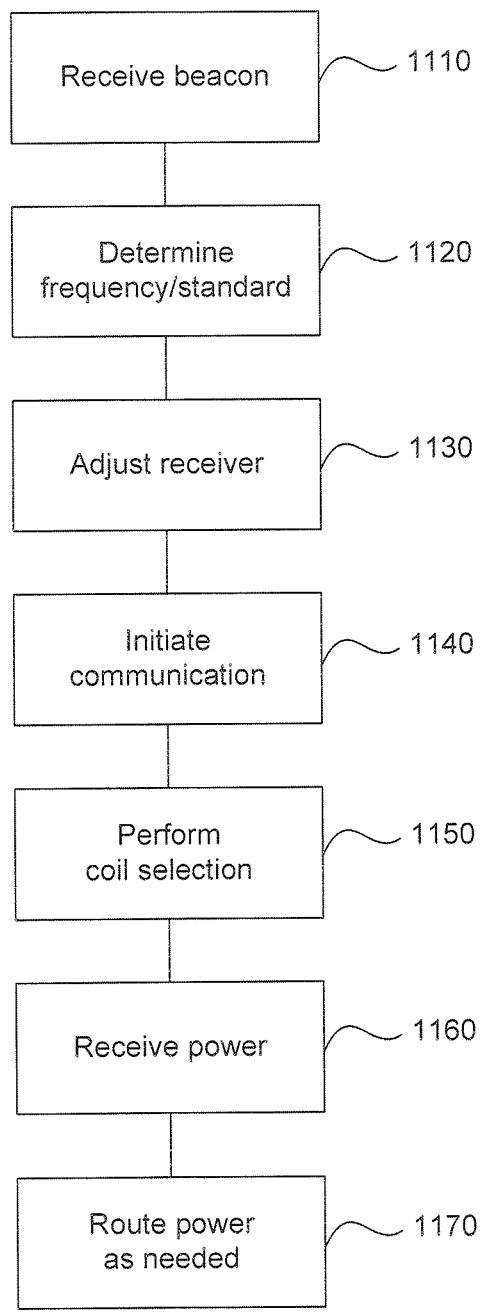
FIG. 11 illustrates a block diagram of a method for wirelessly receiving power from a power station by a chargeable device.

FIG. 11 illustrates a block diagram of a method for wirelessly receiving power from a power station by a chargeable device.

The device begins by receiving a beacon signal from a nearby power station (1110). After receiving the beacon signal, the device may need to determine a frequency and/or standard associated with the beacon signal (1120) so as to properly communicate with the power station. If necessary, the device can then adjust its receiver to the determined frequency (1130) in order to increase communication efficiency with the power station.

Once communication has been established, the device performs an initial communication with the power station (1130), which may include preliminary setup, etc. The preliminary setup exchanges information between the device and the power station that may improve efficiency of their power transfer link.

As the device approaches/contacts the power station, the device performs coil selection with the power station (1150). The coil selection process determines preferred coils from among the power stations available coils and/or the device's coils that are to be used for power transfer. After the coils have been selected, the device can begin to receive power from the power station (1160). This received power can then be routed, together with any power received from other power sources, to any power sink within the device requiring the power (1170).

Those skilled in the relevant art(s) will recognize that the above method can additionally or alternatively include any of the functionality of the chargeable device 150/200/500/ 900 discussed above, as well as any of its modifications. Further, the above description of the exemplary method should neither be construed to limit the method nor the description of the mobile device chargeable device 150/200/ 500/900.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 12:
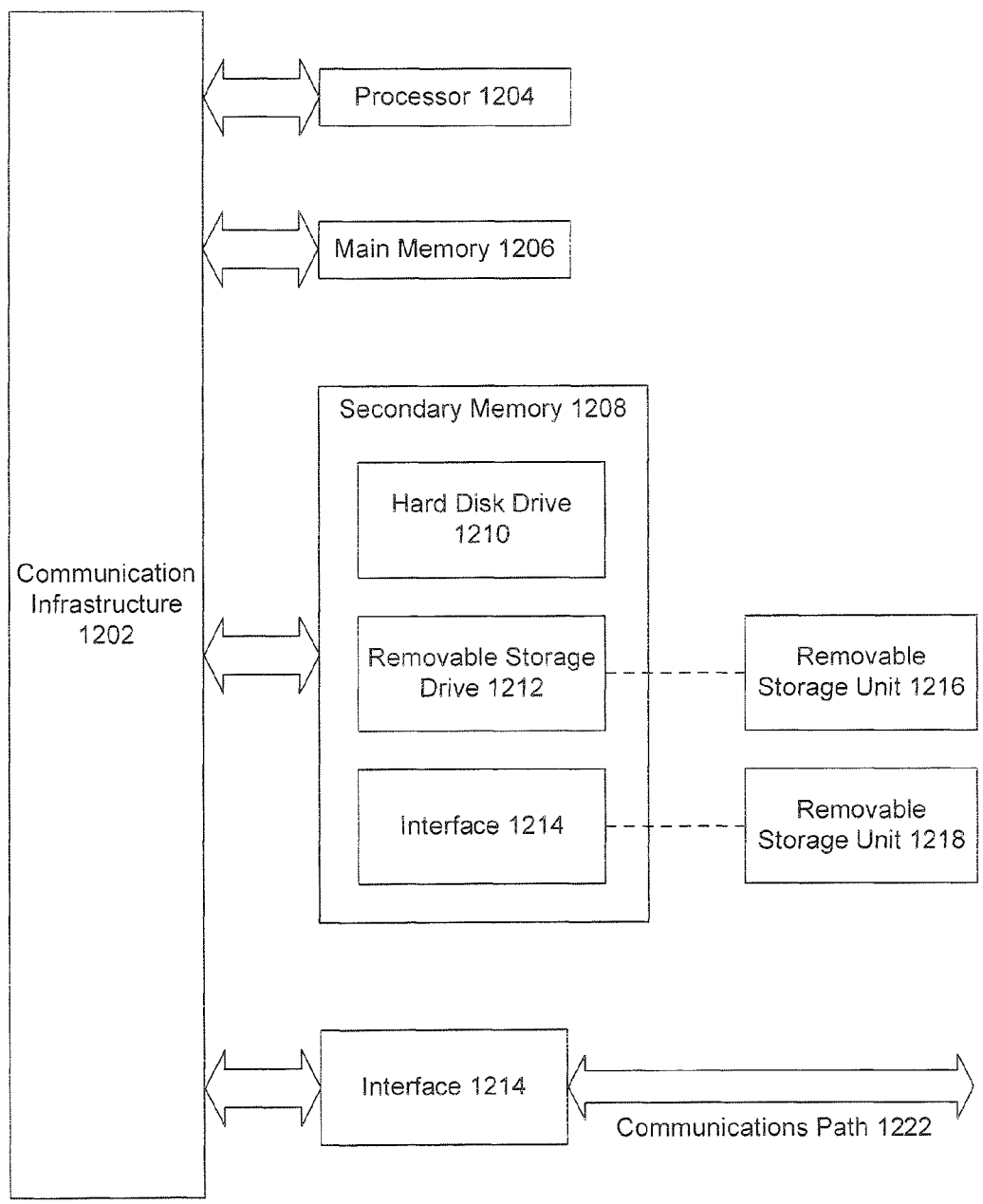
FIG. 12 illustrates a block diagram of an exemplary general purpose computer system.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 1200 is shown in FIG. 12. One or more of the modules depicted in the previous figures can be at least partially implemented on one or more distinct computer systems 1200.

Computer system 1200 includes one or more processors, such as processor 1204. Processor 1204 can be a special purpose or a general purpose digital signal processor. Processor 1204 is connected to a communication infrastructure 1202 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1200 also includes a main memory 1206, preferably random access memory (RAM), and may also include a secondary memory 1208. Secondary memory 1208 may include, for example, a hard disk drive 1210 and/or a removable storage drive 1212, representing a floppy disk drive, a magnetic tape drive, an optical disk drive, or the like. Removable storage drive 1212 reads from and/or writes to a removable storage unit 1216 in a well-known manner. Removable storage unit 1216 represents a floppy disk, magnetic tape, optical disk, or the like, which is read by and written to by removable storage drive 1212. As will be appreciated by persons skilled in the relevant art(s), removable storage unit 1216 includes a computer usable storage medium having stored therein computer software and/or data.

In alternative implementations, secondary memory 1208 may include other similar means for allowing computer programs or other instructions to be loaded into computer system 1200. Such means may include, for example, a removable storage unit 1218 and an interface 1214. Examples of such means may include a program cartridge and cartridge interface (such as that found in video game devices), a removable memory chip (such as an EPROM, or PROM) and associated socket, a thumb drive and USB port, and other removable storage units 1218 and interfaces 1214 which allow software and data to be transferred from removable storage unit 1218 to computer system 1200.

Computer system 1200 may also include a communications interface 1220. Communications interface 1220 allows software and data to be transferred between computer system 1200 and external devices. Examples of communications interface 1220 may include a modem, a network interface (such as an Ethernet card), a communications port, a PCMCIA slot and card, etc. Software and data transferred via communications interface 1220 are in the form of signals which may be electronic, electromagnetic, optical, or other signals capable of being received by communications interface 1220. These signals are provided to communications interface 1220 via a communications path 1222. Communications path 1222 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1216 and 1218 or a hard disk installed in hard disk drive 1210. These computer program products are means for providing software to computer system 1200.

Computer programs (also called computer control logic) are stored in main memory 1206 and/or secondary memory 1208. Computer programs may also be received via communications interface 1220. Such computer programs, when executed, enable the computer system 1200 to implement the present disclosure as discussed herein. In particular, the computer programs, when executed, enable processor 1204 to implement the processes of the present disclosure, such as any of the methods described herein. Accordingly, such computer programs represent controllers of the computer system 1200. Where the disclosure is implemented using software, the software may be stored in a computer program product and loaded into computer system 1200 using removable storage drive 1212, interface 1214, or communications interface 1220.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A power station capable of wireless power transfer (WPT) within a WPT environment, the power station comprising:

a communication module configured to transmit and receive signals of a first communication protocol to and from the environment;

a coil module that includes a plurality of coils;

a coil driving module configured to drive the plurality of coils with WPT signals using WPT communication that is different from the first communication protocol; and a load detection module configured to detect signals loaded onto the coils from the environment, wherein a response signal is received from the environment in response to a transmitted beacon signal via at least one of the communication module and the coil module, and wherein the coil driving module is configured to drive more than one of the plurality of coils with the beacon signal simultaneously so as to transmit the beacon signal to the environment via magnetic coupling of the more than one of the plurality of coils.

2. The power station of claim 1, wherein the communication module is configured to transmit the beacon signal to the environment using at least one of a frequency-hopping spread spectrum communication, WLAN, and NFC communication.

3. The power station of claim 1, wherein the coil driving module is configured to drive each of the plurality of coils simultaneously with the beacon signal so as to transmit the beacon signal to the environment.

4. The power station of claim 1, wherein the coil module includes an outer coil that overlaps with at least two of the plurality of coils, and wherein the coil driving module drives the outer coil with the beacon signal so as to transmit the beacon signal to the environment.

5. The power station of claim 1, wherein the beacon signal is transmitted to the environment in sequentially one of: different standards, different duty cycles, and different transmission powers.

6. The power station of claim 1, wherein the beacon signal is a universal beacon signal with a predetermined packet layout.

7. The power station of claim 1, wherein the beacon signal is periodically transmitted using a first WPT communication scheme and periodically transmitted in a second WPT communication scheme, wherein the frequencies of the respective transmissions are based on a popularity of the first and second WPT communication schemes.

8. The power station of claim 1, wherein each of the more than one of the plurality of coils are adjacent to another of the more than one of the plurality of coils.

9. A method for establishing communication with a nearby chargeable device by a power station, the method comprising:

transmitting a beacon signal to the chargeable device by driving more than one of a plurality of coils with the beacon signal simultaneously so as to transmit the beacon signal via magnetic coupling of the more than one of the plurality of coils;

receiving a response signal from the chargeable device in response to the beacon signal;

performing a coil selection procedure based on a proximity of the chargeable device to the power station, the proximity being determined based on the response signal; and selecting one or more coils from among the plurality of coils for transmitting wireless power signals to the chargeable device based on the coil selection.

10. The method of claim 9, wherein the beacon signal is transmitted to the chargeable device using sequentially different communication standards, wherein the plurality of coils transmit the beacon signal in a first one of the communication standards, and wherein a radio transmits the beacon signal in a second one of the communication standards.

11. The method of claim 10, wherein the first one of the communication standards is a load modulation wireless power transfer (WPT) standard, and wherein the second one of the communication standards is one of a frequency-hopping spread spectrum communication, WLAN or NFC.

12. The method of claim 9, wherein the coil selection procedure includes transmitting a signal from each of the plurality of coils and receiving a coil preference signal from the chargeable device in response to the transmission of the signal.

13. The method of claim 9, wherein the coil selection procedure includes receiving a signal on each of the plurality of coils from the chargeable device and calculating coupling coefficients for each of the plurality of coils based on signal characteristics of the corresponding received signals.

14. The method of claim 9, wherein the beacon signal identifies wireless power transfer (WPT) communication schemes supported by the power station, and wherein the response signal identifies WPT communication schemes supported by the chargeable device.

15. A power station capable of wireless power transfer (WPT) within a WPT environment, the power station comprising:

a communication module configured to transmit and receive signals of a first communication protocol to and from the environment, and configured to transmit a beacon signal identifying available communication protocols of the power station that include the first communication protocol of the power station, the beacon signal being transmitted to the WPT environment without a designated recipient;

a coil module that includes a plurality of coils;

a coil driving module configured to drive the plurality of coils with WPT signals using WPT communication that is different from the first communication protocol; and a load detection module configured to detect signals loaded onto the plurality of coils from the environment, wherein a response signal is received from the environment in response to the beacon signal in accordance with a communication protocol from among the available communication protocols.

* * * * *